G. W. COOK, Jr.
OILING DEVICE.
APPLICATION FILED DEC. 3, 1909.
988,080.
Patented Mar. 28, 1911.
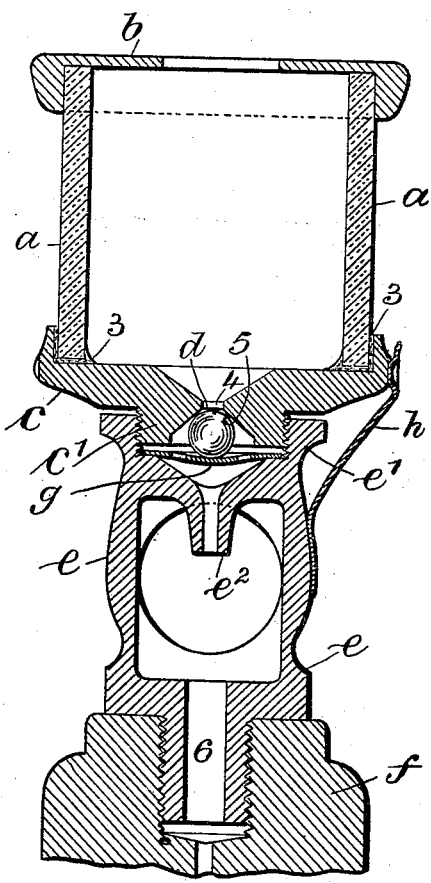
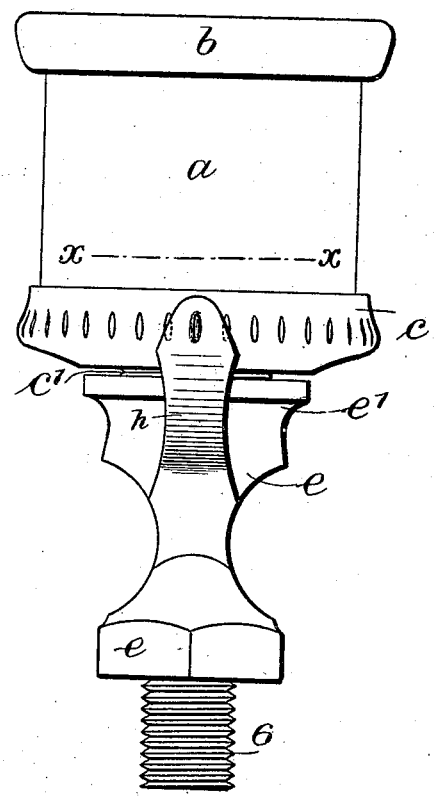
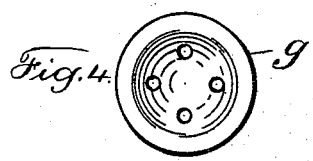
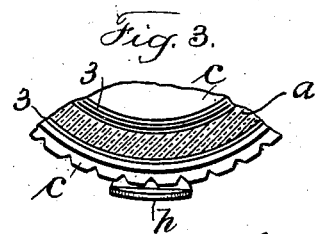
Witnesses
Chas H Smith
A. H. Serrell
Inventor
George W. Cook Jr.
by Harold Serrell
his atty

UNITED STATES PATENT OFFICE.

GEORGE W. COOK, JR., OF BAINBRIDGE, NEW YORK, ASSIGNOR TO AMERICAN SEPARATOR COMPANY, OF BAINBRIDGE, NEW YORK, A CORPORATION OF NEW YORK.

OILING DEVICE.

988,080.  Specification of Letters Patent.  Patented Mar. 28, 1911.

Application filed December 3, 1909. Serial No. 531,137.

*To all whom it may concern:*

Be it known that I, GEORGE W. COOK, Jr., a citizen of the United States of America, residing at Bainbridge, in the county of Chenango and State of New York, have invented an Improvement in Oiling Devices, of which the following is a specification.

My invention relates to an improved oiler having adjustable means for regulating the supply of lubricant to parts of machinery, with the object of effecting an even regulation of the feed as the result of a regular annular discharge of lubricant progressively controlled or closed off entirely and an automatic and positive seating of a valve device.

In carrying out my invention, I employ a stationary part or frame member to be connected to a part of the machinery and a revoluble part connected therewith, the revoluble part having an axial aperture and conical seat in the base thereof, and I employ a globular or ball-valve supported upon a perforated diaphragm and adapted to be seated against said conical seat. The conical seat is a part of the revoluble oil receptacle which latter is adapted to be moved axially and is provided with means for holding the same against accidental turning. The ball or globular valve automatically finds its seat with the turning of the revoluble manually actuated member and the lubricant is delivered from the receptacle through said axial opening evenly over the ball or globular valve regardless of the quantity flowing, and the oil is furthermore visible in passing through the frame member to the parts of the machinery to be lubricated.

In the drawing, Figure 1 is an elevation generally representing the device of my improvement. Fig. 2 is a vertical section of the same. Fig. 3 is a partial sectional plan at about the dotted line $x$, $x$, of Fig. 1, and Fig. 4 is a plan of the perforated diaphragm supporting the globular or ball valve.

The revoluble member manually actuated comprises the glass cylinder $a$ preferably provided with a metal cover $b$ having a central opening through which oil is poured into the cylinder. A base $c$ of metal is provided with a circumferential flange adapted to receive the base of the glass cylinder $a$ and in which the same is secured by cement at 3. An axial opening 4 is made in the base $c$ with beveled faces at each side of the opening and the lower beveled face forms a seat 5 for a globular or ball valve $d$. The lower portion of the base $c$ is formed as a hub $c^1$ exteriorly threaded and adapted to screw into the cup-shaped upper end $e^1$ of the frame member $e$ which cup-shaped part is interiorly threaded and a recess or cavity is formed between the under surface of the hub member $c^1$ of the base and the upper surface of the frame member $e$ within the cup-shaped upper end $e^1$. This frame member $e$ is stationary, being screwed into the body part $f$ of the machine to be lubricated, and for this purpose the tubular base 6 of the frame member is exteriorly threaded to fit the apertured and interiorly threaded upper end of the body part $f$ of the machine. The frame member as will be seen from Figs. 1 and 2, has an opening therethrough and from the upper part a discharge nozzle $e^2$ projects downward into the open part of the frame member.

$g$ represents a perforated diaphragm in the cup-shaped upper end $e^1$ resting upon shoulders provided therefor at the base of the interiorly threaded portion. This perforated diaphragm is slightly depressed in the center and supports and substantially centers the globular or ball valve $d$.

I have shown and prefer to provide the periphery of the base $c$ with a notched surface or edge and to employ a spring arm $h$ secured to the frame member $e$ and at its upper free end bearing against the notched periphery of the base so as to engage the notches thereof and prevent any accidental turning movement on the part of the revoluble member.

The spring arm $h$ normally holds the revoluble member against accidental turning movement. In the operation of the device the said revoluble member rises and falls by virtue of its turning movement, or in other words, rises and falls when manually turned so as to adjust the supply of oil. This turning movement brings the surfaces of the base $c$ and cup-shaped upper end $e^1$ of the cup-shaped part closer together or farther apart and also brings the surface of the globular or ball valve $d$ nearer to or farther from the under beveled face of the base $c$, which forms a seat therefor. These parts may be brought into a relationship of close contact so as to prevent any oil in the revoluble oil receptacle from passing down by the valve, or opened up slightly, to the desired extent, to permit regulatable quantities of oil to gravitate past the ball valve through the perforations in the diaphragm and down through the nozzle $e^2$ where the feed by drops is visible through the opening in the frame as it falls from the nozzle into and through the tubular base and so by way of the proper channel provided, to the part of the machinery to be lubricated.

The globular or ball valve is normally maintained substantially central or axial of the device but is free to move laterally to any extent so that as the revoluble member is screwed down to place and contacts with the ball the same immediately moves if necessary to find its contact and seat with the under beveled face or seat 5 of the base $c$ so as to close off the opening 4 or to regulate to a nicety the oil delivered from the receptacle for lubricating purposes.

I claim as my invention:

1. The combination with a suitable stationary frame member, of a revoluble oil receptacle co-acting therewith having an axial aperture and beveled seat in the base thereof to open up or close off the supply of lubricant with the turning of the revoluble oil receptacle, an automatically acting globular valve adapted to come against the said seat for the said purpose and a support for the valve on the frame member above the outlet.

2. The combination with a suitable stationary frame member, of a revoluble oil receptacle co-acting therewith having an axial opening and beveled seat in the base thereof, a perforated diaphragm suitably supported in the upper end of the stationary frame member and an automatically acting valve supported by the diaphragm and adapted to come against the said seat to close or regulate the amount of oil delivered upon the revolution of the oil receptacle.

3. An oiling device comprising a stationary frame member having means connecting the same to machinery to be lubricated, and an interiorly threaded cup-shaped upper end, a revoluble receptacle for lubricant comprising a glass cylinder, a base to which the same is secured having an exteriorly threaded hub member on the bottom of the base adapted to be received by the interiorly threaded cup-shaped end of the frame member and having a seat, and the said base and cup-shaped end axially apertured, a globular or ball valve in the space between the revoluble member and the cup-shaped upper end adapted to come against said seat, and a perforated centering member acting as a support for the valve.

4. An oiling device comprising a glass cylinder, a metal base having a flange receiving the same and to which the glass is secured, and having a hub member on said base exteriorly threaded and the base axially apertured and provided with beveled faces, one of which forms a seat and said parts revoluble, a stationary part comprising a frame member adapted to be secured to the part of the machinery to be lubricated and having at its upper end a cup-shaped part interiorly threaded and adapted to receive the exteriorly threaded hub member of the revoluble part, a perforated diaphragm fitting within the cup-shaped upper end and a globular or ball valve supported by the diaphragm and adapted to come against the beveled face of the revoluble base, forming a seat therefor, so as to close off or regulate the amount of oil delivered.

5. An oiling device comprising a glass cylinder, a metal base having a flange receiving the same and to which the glass is secured, and having a hub member on said base exteriorly threaded and the base axially apertured and provided with beveled faces, one of which forms a seat and said parts revoluble, a stationary part comprising a frame member adapted to be secured to the part of the machinery to be lubricated and having at its upper end a cup-shaped part interiorly threaded and adapted to receive the exteriorly threaded hub member of the revoluble part, a perforated diaphragm fitting within the cup-shaped upper end and a globular or ball valve supported by the diaphragm and adapted to come against the beveled face of the revoluble base, forming a seat therefor so as to close off or regulate the amount of oil delivered, and said stationary frame member provided with a discharge nozzle located axially thereof and beneath the globular or ball valve.

Signed by me this 27th day of November 1909.

GEORGE W. COOK, Jr.

Witnesses:
 STANLEY BEAGLE,
 EARL A. WESTCOTT.